United States Patent [19]

Dechelette

[11] Patent Number: 4,527,853

[45] Date of Patent: Jul. 9, 1985

[54] MINIATURE ELECTRICAL CONNECTOR ASSEMBLY

[75] Inventor: Helen Dechelette, London, England

[73] Assignee: Molex Incorporated, Lisle, Ill.

[21] Appl. No.: 555,784

[22] Filed: Nov. 28, 1983

[30] Foreign Application Priority Data

Nov. 14, 1983 [GB] United Kingdom ................ 8330346

[51] Int. Cl.[3] ............................................ A01R 13/38

[52] U.S. Cl. ................................................ 339/97 R

[58] Field of Search ..................... 339/97 R, 97 P, 98, 339/99 R

[56] References Cited

U.S. PATENT DOCUMENTS 3,648,044 3/1972 Barnard et al. .................. 339/97 R 4,283,104 8/1981 Pemberton ....................... 339/97 R

*Primary Examiner*—Joseph H. McGlynn

*Attorney, Agent, or Firm*—Louis A. Hecht; Bruce R. Mansfield

[57] ABSTRACT

A unitary electrical contact member for terminating an insulated conductor includes a body member supporting a pair of plate portions in parallel spaced apart relation with respect to one another. Each plate portion has an insulation displacement slot which establishes contact with the conductor such that the longitudinal axis of the conductor is oriented normally of the plate portions. A first contact finger depending from the body member cooperates with a second contact finger depending from one of the plate portions thereby providing a receptacle for establishing a biased connection with a pin terminal. The configuration of the contact fingers is such that the pin terminal has its longitudinal axis oriented parallel to the conductor resulting in a highly compact arrangement suitable for miniature electrical connector applications.

4 Claims, 5 Drawing Figures

MINIATURE ELECTRICAL CONNECTOR ASSEMBLY

BACKGROUND OF THE INVENTION

1. Field of the Invention

This invention relates generally to a connector assembly for terminating electrical conductors and, more specifically, to a connector assembly having the capability of being highly miniaturized as a result of its contact configuration and contact mounting structure.

2. Description of the Prior Art

Connector assemblies for terminating insulated electrical conductors have become increasingly relied upon in the manufacture of complex electronic and electromechanical equipment. In the manufacture of video cameras, for example, wherein a plurality of electrical components must be arranged in a preferrably compact overall structure, miniature connectors are often a preferred means for interconnecting printed circuit board assemblies with discrete wiring leading from other components.

To provide for such interconnection, the printed circuit boards are often adapted with generally elongated pin terminals which have been electrically connected to conductive circuit paths defined on the boards. The pin terminals may either be free standing or part of a preassembled unit, customarily called a wafer.

Connectors of a type suitable for terminating discrete insulated conductors to elongated pin terminals typically comprise a dielectric housing fitted with a plurality of metallic contact members. Each contact member has a portion such as a receptacle for selectively receiving or mating with one of the pins.

Connection of the conductor to the contact may be made by one of several methods. One method is known as insulation displacement. Insulation displacement comprehends forcing a conductor into a slot formed in a contact such that the conductor insulation is severed and displaced from the region of the electrical interface between the edges of the slot and the conductor core.

Known connectors for terminating discrete wire to pin terminals have inherent disadvantages when used in miniaturized circuitry applications. These disadvantages result principally from the complexity of known contact structures and from the consequent inability to manufacturer such structures economically on a miniature scale with assurance of their reliable performance throughout the vagaries of use.

SUMMARY OF THE INVENTION

Accordingly, it is an object of the present invention to provide an improved electrical connector assembly for connecting discrete insulated conductors to pin terminals.

A further object is to provide an improved connector contact member which is capable of being easily manufactured in a highly miniaturized form.

A still further object of the instant invention is to provide a contact member which can effect both insulation displacement contact with a conductor and connection to a pin terminal, in a highly compact arrangement.

The foregoing and other objects and advantages are accomplished by the present invention, wherein, a unitary contact member has a body portion supporting a pair of plates in substantially parallel spaced apart relationship one to another, and the plates have slots for severing and displacing the insulation of a conductor inserted within them. The contact member further comprises pin receiving means including a first pair of resilient spring arms, one spring arm depending from each of the plates, and a second pair of resilient spring arms depending from the body portion of the contact member such that the pairs of spring arms are in opposed relationship and, therefore, are capable of establishing a biased electrical connection with the pin terminal.

BRIEF DESCRIPTION OF THE DRAWINGS

The aforementioned objects and features of the invention, as well as other objects and features, will be better understood upon consideration of the following detailed description and appended claims taken in conjunction with the attached drawing of an illustrative embodiment thereof in which:

DESCRIPTION OF THE PREFERRED EMBODIMENT

Figure 1:
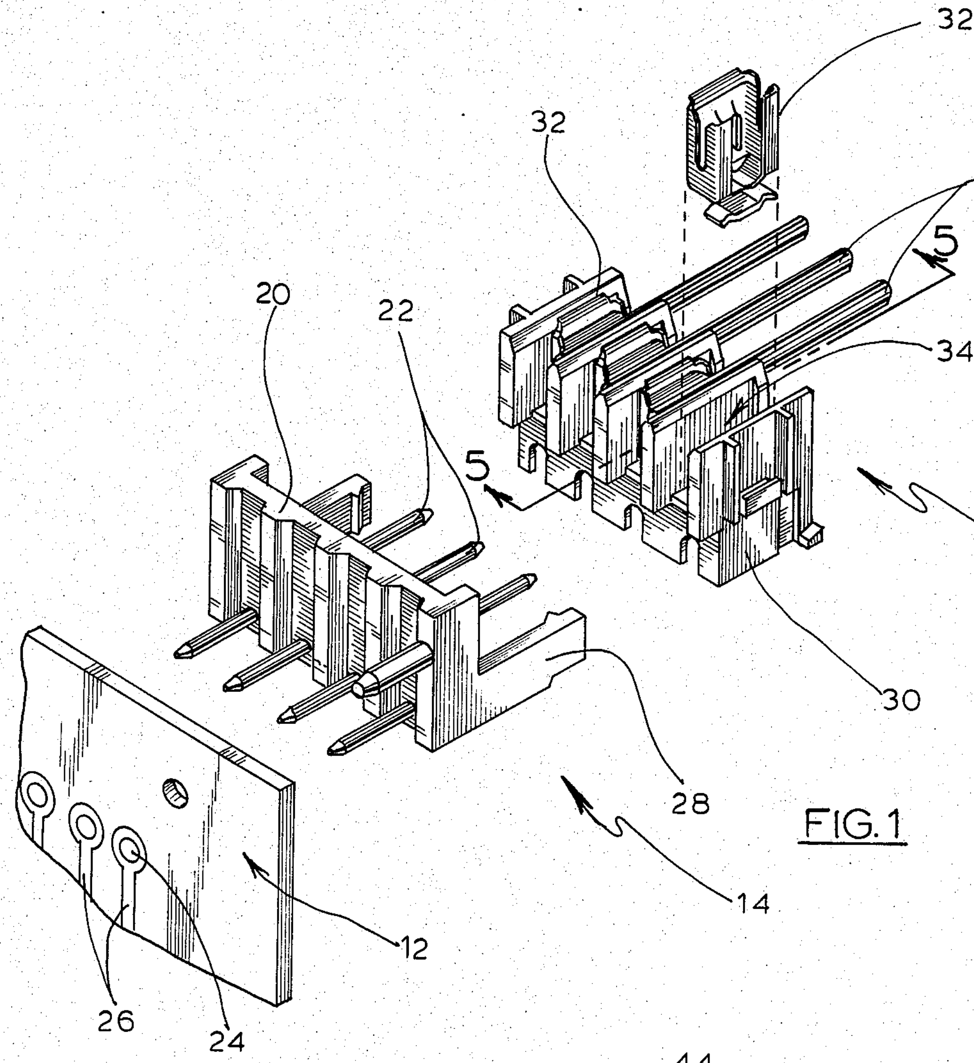
FIG. 1 is an exploded perspective view of a circuitry arrangement illustrating the connector assembly of the present invention.

Referring now to the drawings, in FIG. 1, there is shown a circuitry arrangement of the type suitable for in use in electro-mechanical or electronic applications. The arrangement generally comprises a printed circuit board 12 on which a plurality of semi-conductor or other electronic devices (not shown) are mounted. For selective connection to the printed circuit board 12, the circuitry arrangement 10 further includes a wafer assembly, generally designed 14, and a connector assembly, generally designated 16, for terminating a plurality of insulated electrical conductors 18.

In order to provide for the mechanically stable coupling of the connector assembly 16 to the printed circuit board 12, the wafer assembly 14 includes a relatively rigid base member 20 through which a plurality of elongated conductive pin terminals 22 have been inserted. The printed circuit board 12 is adapted with apertures 24 for receiving the pin terminals 22 such that the pin terminals 22 may be electrically connected by soldering to a plurality of corresponding circuit paths 26 defined on the printed circuit board 12. The wafer assembly 14 is also adapted with latching arms 28 for the purpose of holding the connector assembly 16 in fixed disposition with respect to the printed circuit board 12.

The connector assembly 16 comprises a dielectric housing 30 fitted with a plurality of metallic contact members 32 received in respective recesses 34 of the housing 30. A plurality of apertures 36 communicate with the recesses 34 along a bottom edge 38 of the housing, permitting connection of the pin terminals 22 to the contact members 32.

Figure 2:
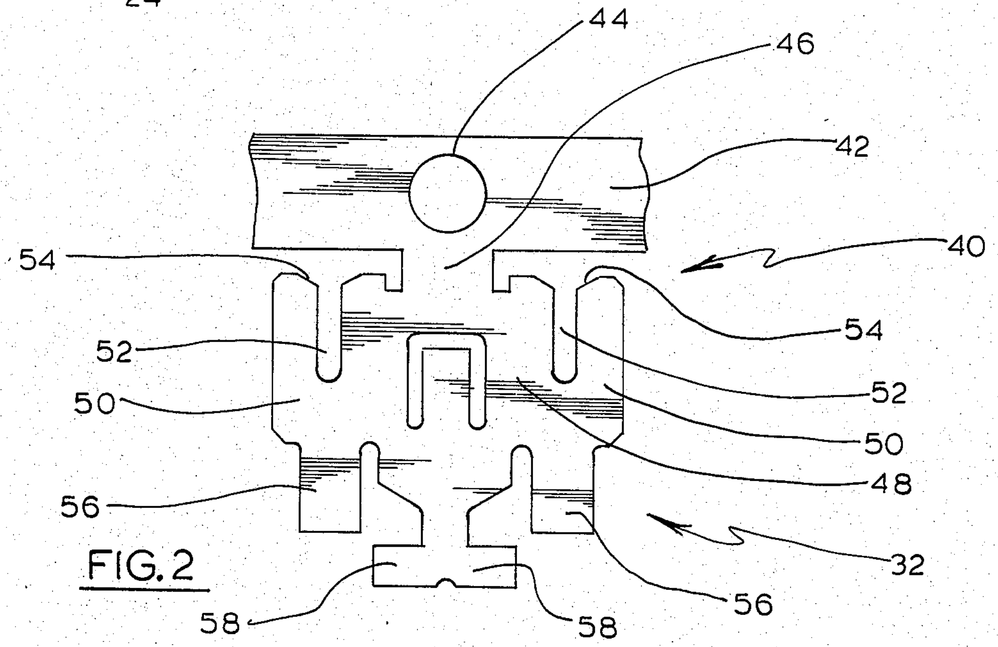
FIG. 2 is a plan view of a terminal blank from which a contact member shown in FIG. 1 may be formed.

Turning to FIG. 2, the contact member 32 is illustrated as it would appear in the form of a flat stamped blank, designated generally by the reference numeral 40. To facilitate the manufacture and handling of the contact 32, the blank 40 includes a continuous carrier 42 having indexing apertures 44 which may be used to advance the blank 40 in the stamping and forming process. The contact 32, which extends from the carrier 42 from a break-away tang 46, has a central body portion 48 with a pair of substantially identical plate portions 50 extending from each side thereof. Each plate portion 50 has a slot 52 with a chamferred opening 54 for receiving an insulated conductor 18 and establishing electrical contact with the conductor 18 by severing and displacing the conductor's insulative coating. Each plate portion 50 is further adapted with a contact finger 56 cantilevered downwardly from a bottom edge thereof. The body portion 48 of the contact member 32 also has a pair of contact fingers 58 extending in a T-shape configuration along its bottom edge.

Figure 3:
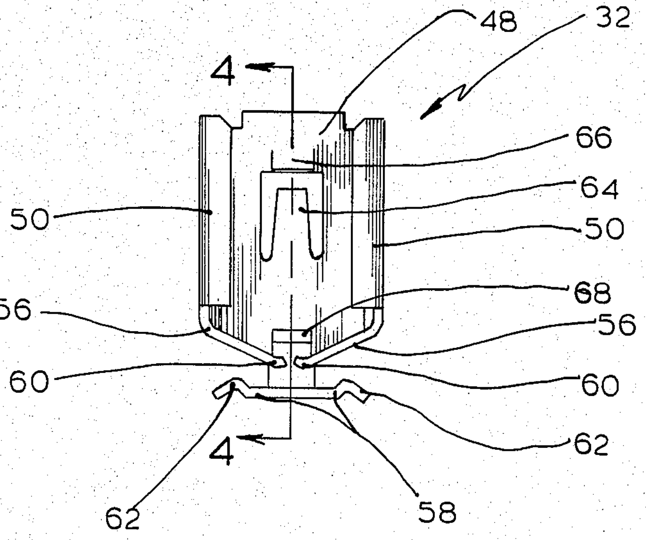
FIG. 3 is a front elevational view of the contact member in its fully formed state.
Figure 4:
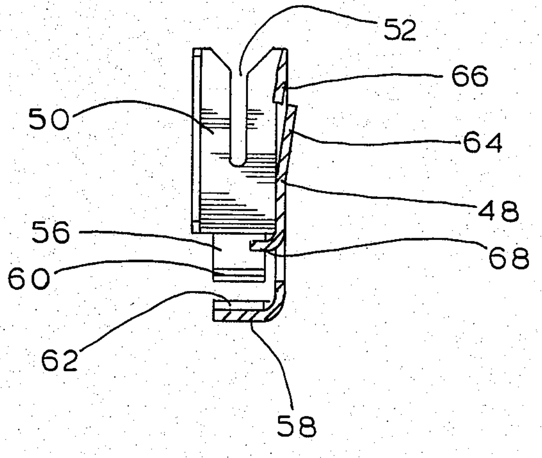
FIG. 4 is a cross-sectional view of the contact member taken generally along the line 4—4 of FIG. 3.

In the sectional views of FIGS. 3 and 4, the contact member 32 is illustrated in its fully formed state, wherein the plate portions 50 have been bent at substantially 90 degrees to the body portion 48 and thus are positioned in parallel spaced apart relationship one to another. The contact fingers 56 are also formed inwardly of the plate portions 50 with a slight radius 60 in each of their ends. The contact fingers 58 are bent upwardly with respect to the body portion 48 and each finger 58 is formed with a crown 62. For retention of the contact member 32 in the housing 30, a locking lance 64 is struck outwardly of the body portion 48. An inwardly directed tang 66 is provided for strain relief of the insulated conductor 18 once the conductor 18 has been inserted into the slots 52. A stop 68 is provided in the body member 48 to limit excessive movement of the contact fingers 66 upon insertion of a pin terminal 22 into the contact member 32.

Figure 5:
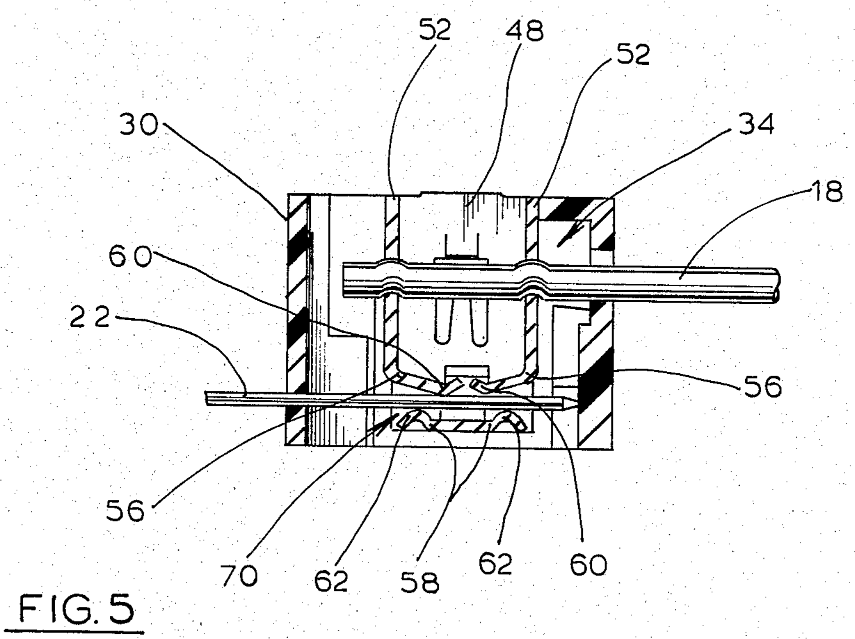
FIG. 5 is a side sectional view of the connector assembly illustrated in FIG. 1.

Turning now to FIG. 5, the contact member 32 is seen inserted in a recess 34 of the housing 30. An insulated conductor 18 having its longitudinal axis disposed substantially normally of the plate portions 50 is terminated to the contact member 32 by means of the insulation displacement slots 52.

The configuration of the contact fingers 56 and 58 defines, essentially, a receptacle, designated generally by the reference numeral 70, into which the pin terminal 22 is slidingly receivable in parallel relation to the conductor 18. Multiple points of contact are established with the pin terminal 22 by the radiused portions 60 and crowns 62 of the contact fingers 56 and 58, respectively.

With reference particularly to FIG. 2, it can be appreciated that the instant contact 32 is manufacturable with very little waste of material because of the efficient orientation of the pairs of contact fingers 56 and 58. Moreover, since relatively few steps are required to form the contact blank 40 into a completed member, the contact 32 may be highly miniaturized without the requirement of intricate and expensive tooling or fixtures. For example, a connector according to the invention can be readily formed to have a contact pitch or center spacing as small as two millimeters. It can be further appreciated from the cross-sectional view of FIG. 5 that close spacing of the conductor and pin terminal centerlines is likewise possible, facilitating a highly compact overall assembly.

I claim:

1. A unitary electrical contact member for terminating an insulated conductor, the contact member having a pair of plate portions each with a slot formed therein for severing and displacing the insulation of a conductor disposed within the slot, the longitudinal axis of the conductor oriented substantially normally of the plate portions when terminated to the contact member, and the plate portions depending from a body member formed integrally between the plate portions the improvement comprising:

a first finger depending from an edge of the body member and a second finger depending from one of the plate portions, the first and second fingers disposed in opposed spaced apart relationship one to another and cooperating to provide biased contact with a generally elongated terminal member having its longitudinal axis oriented substantially parallel to the longitudinal axis of the terminated conductor.

2. The electrical contact member of claim 1 wherein the second finger is cantilevered in a direction generally inwardly of the space between the plate portions.

3. The electrical contact member of claim 1 wherein the first finger is adapted with a crown for establishing a point of contact with the terminal member.

4. An unitary electrical contact member for terminating an insulated conductor, the contact member adapted to be received in an insulating housing and having a pair of generally parallel plate portions depending from a central body member, the plate portions each having a slot for receiving an insulated conductor and establishing an electrical connection between the contact member and conductor by severing and displacing the insulation of the conductor the improvement comprising:

a first pair of contact fingers depending from an edge of the body member and cantilevered generally outwardly from one another, a second pair of contact fingers each depending from one of the plates and cantilevered generally toward one another, and the first and second pairs of contact fingers cooperating to provide a receptacle for establishing contact with a generally elongated pin terminal having its longitudinal axis oriented substantially parallel to the longitudinal axis of the terminated conductor.

* * * * *